Sept. 25, 1962      A. F. CHOUINARD      3,055,356
HEART SIGNAL GENERATING APPARATUS
Filed Sept. 1, 1960      2 Sheets-Sheet 1
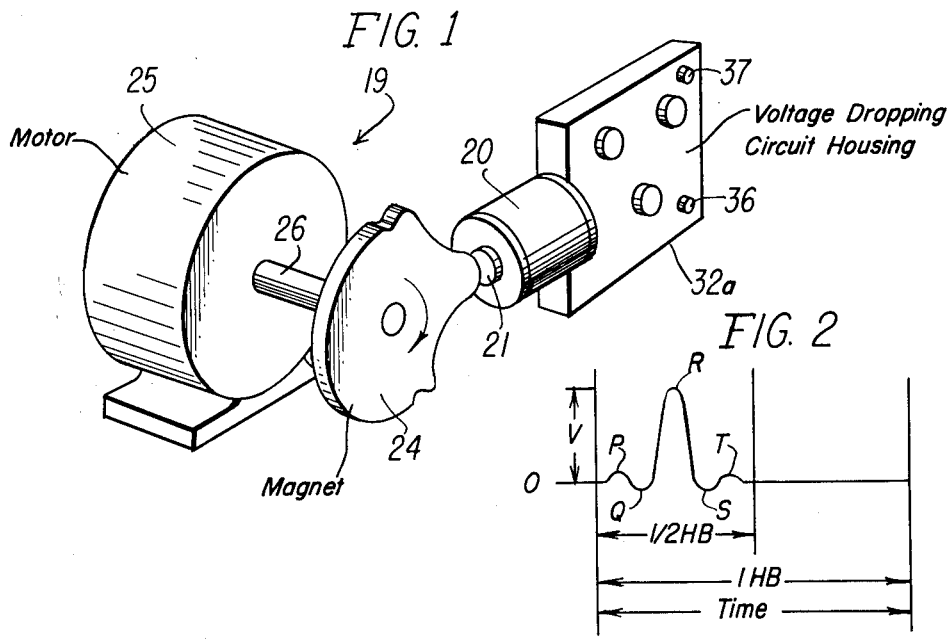
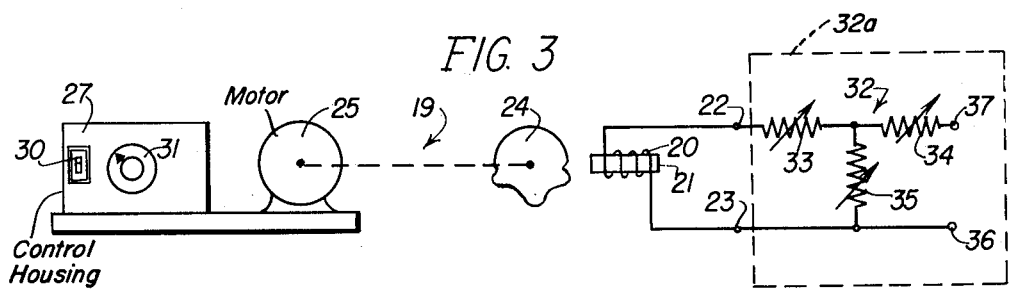
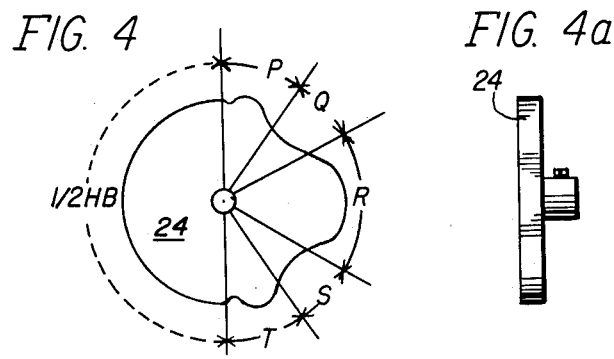
INVENTOR.
Alfred F. Chouinard
BY
N. M. Esser.
Atty.

Sept. 25, 1962 A. F. CHOUINARD 3,055,356
HEART SIGNAL GENERATING APPARATUS
Filed Sept. 1, 1960 2 Sheets-Sheet 2
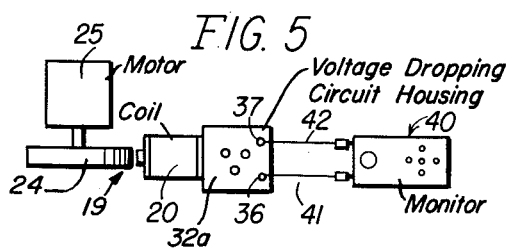
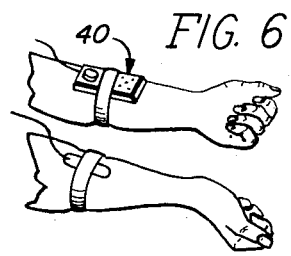
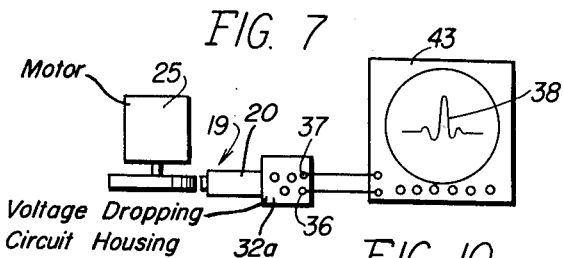
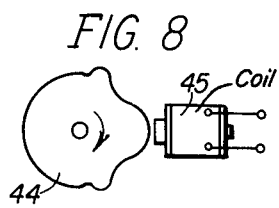
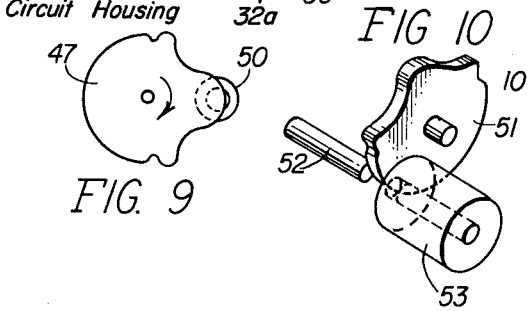
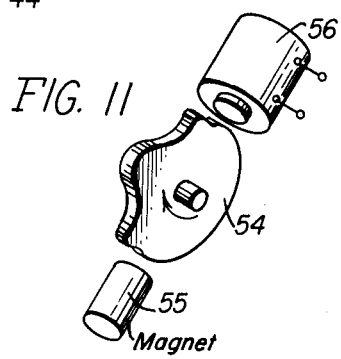
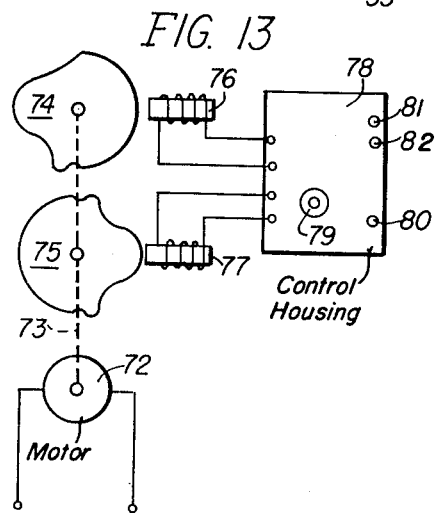
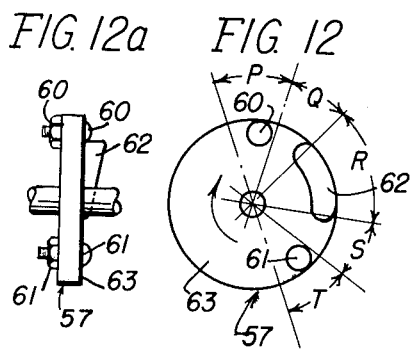
INVENTOR.
Alfred F. Chouinard
BY
n. m. Esser.
Atty.

United States Patent Office 3,055,356
Patented Sept. 25, 1962

3,055,356
HEART SIGNAL GENERATING APPARATUS
Alfred F. Chouinard, Chicago, Ill., assignor to Chemetron Corporation, Chicago, Ill., a corporation of Delaware
Filed Sept. 1, 1960, Ser. No. 53,472
5 Claims. (Cl. 128—2.05)

The present invention relates to signal generating apparatus, and more particularly to apparatus for generating a pattern of electrical signals having a wave form and magnitude corresponding to the characteristic electrical potentials measurable on the body of a human being due to the electrical activity of the heart.

A number of types of cardiac diagnostic devices are presently available for measuring, monitoring, or registering the electrical activity of the human heart. One example is the electrocardiograph. Another example is the heart monitor. Before such a device can be employed to test or monitor patients, it is necessary that the device be in proper operating condition so as to accurately reflect the electrical activity of the heart of a patient undergoing test. One method of determining whether such a device is in proper operating condition consists of connecting the electrodes of the device to a human subject with a "normal" heart condition and observing the signals to determine if the "normal" condition is reflected in the test results. However, there is the problem of finding an available subject with a "normal" heart condition. Also, assuming such a subject could be found, this would not constitute a continuously uniform test standard because, as is well known, the electrical heart signal pattern generated by an individual may vary from day to day depending on the individual's body condition at the time of the test.

In the manufacture and utilization of electrocardiographs, heart monitors, and similar devices, it would be advantageous therefore to have available for test purposes signal generating apparatus adapted to generate an accurate and uniform signal pattern representative of the electrical characteristics of a human heart. Such apparatus would facilitate the production of a more uniform and accurate electrocardiograph, heart monitor, or similar product than would be possible if such a reliable test standard were not available.

In hospitals or similar locations using devices such as electrocardiographs and heart monitors, it is obvious that it would be highly desirable to have available at all times a reliable standard device for testing electrocardiographs and heart monitors before they are used on patients. Such a test device would thus provide an indication that the electrocardiograph, heart monitor, or other cardiac diagnostic tool would be in operable condition.

Accordingly, it is the principal object of this invention to provide apparatus for testing cardiac monitoring, measuring, or registering devices to pre-ascertain their condition for accurately reflecting the electrical activity of the human heart.

Another object of this invention is to provide apparatus for simulating the electrical activity of the heart which generates an electrical signal pattern having substantially the same wave form and magnitude as the electrical signal pattern generated by the electrical activity of an "average" heart.

A further object is to provide a reliable method for testing cardiac diagnostic tools.

Still another object of the invention is to provide a device for testing cardiac diagnostic tools which is accurate, positive, simple in operation, and inexpensive to manufacture.

Briefly stated, and as illustrated in the accompanying drawings, there is provided an electrical signal generating device which includes a coil having a plurality of turns. The turns of the coil are linked by lines of flux associated with the permanent magnet pole piece of the coil. The coil generates an electrical voltage whenever the magnetic field around it is disturbed. Adjacent the coil, an actuating medium consisting of a cam-like disc of magnetic material is mounted for rotation relative to the coil. A principal feature of the present invention consists of the configuration of the disc of magnetic material. The outer periphery of the disc has a shape which includes a pattern of peaks and valleys related to the wave form of the measured electrical characteristics of a human heart. A motor is provided to rotate the disc relative to the coil at a suitable speed. Accordingly, as the motor rotates the disc relative to the coil, the lines of flux linking the coil turns are shifted due to the changing mass of magnetic material passing the coil. A voltage varying with the rate of change of the magnetic field is thereby generated within the coil which corresponds substantially to the pattern of potentials measured on a body due to the electrical activity of the heart. The magnitude of the voltage may be appropriately adjusted by connecting to the coil a suitable voltage dropping circuit provided with output terminals for the signal generating device. Thus, an electrocardiograph or a heart monitor can readily be subjected to a positive test by connecting its input terminals to the output terminals of a signal generating device embodying the present invention.

The invention, both as to its organization and method of operation, together with further objectives and advantages, will be described in greater detail below in connection with the accompanying drawings in which:

FIG. 1 is a somewhat schematic representation of an arrangement embodying the present invention shown in perspective;

FIG. 2 is a graphical representation of the wave form pattern of the potentials measured on a human body due to the electrical activity of a normal human heart;

FIG. 3 is a digrammatic representation of the arrangement of FIG. 1 illustrating a simplified circuit diagram including the coil employed in the present invention;

FIG. 4 is a front elevational view of a disc employed in the arrangement of FIG. 1 illustrating the shape of the disc periphery;

FIG. 4a is a side elevational view of the disc of FIG. 4;

FIG. 5 is a somewhat schematic representation of the structure of FIGS. 1 and 3 embodying the present invention as it is used in testing a cardiac diagnostic tool such as a heart monitor;

FIG. 6 is a fragmentary view illustrating a heart monitor in use after it has been successfully tested by a device embodying the present invention;

FIG. 7 is a somewhat schematic representation of the structure of FIGS. 1 and 3 embodying the present invention connected to a cathode ray oscilloscope;

FIG. 8 is a simplified schematic arrangement showing the mounting relationship between the coil and the disc in the preferred form of the present invention illustrated in more detail in FIGS. 1 and 3;

FIG. 9 is a simplified view, similar to FIG. 8, illustrating a modified arrangement of the disc and coil of the present invention;

FIG. 10 illustrates another schematic representation of a modification employing a bar-type permanent magnet;

FIG. 11 is a schematic view of still another modification of the invention employing a bar-type permanent magnet;

FIG. 12 is a front elevational view, similar to FIG. 4 illustrating the use of separate sections of magnetic material mounted on a non-magnetic rotating member employed in a further modification of the invention;

FIG. 12a is a side elevational view of the disc of FIG. 12; and

FIG. 13 illustrates another modified arrangement embodying the present invention which has been successfully employed in the production testing of heart monitoring devices.

Referring again to the drawings and particularly to FIG. 1, there is illustrated a signal generating apparatus 19 including an electrical conductor wire coil 20 having a plurality of mutually insulated turns (not shown) mounted on a pole piece 21, and provided with a pair of terminals 22 and 23. In the modification of the invention shown in FIG. 1, the pole piece 21 is a permanent magnet. Mounted adjacent coil 20 is an actuating medium consisting of a shaped disc 24 of magnetic material such as iron or steel. The disc 24 in the preferred form illustrated in FIGS. 1, 3, and 4 has a substantially flat cam-like shape with its outer peripheral edge having an asymmetrical configuration related to the shape of the wave form of the electrical activity of a human heart as described in detail below. Means including a motor 25 are provided for producing relative movement between the coil 20 and the disc 24. The disc 24 is mounted for rotation on a shaft 26 of the motor 25 which is connected to an electrical power source (not shown) and which may be provided with suitable control means enclosed within a control housing 27 as shown in FIG. 3. The controls for the motor 25 may advantageously include an "on-off" switch 30, and suitable means for varying the motor speed such as a rheostat (not shown) controlled by a knob 31.

Referring now to FIG. 2, there is shown a graphical representation of a human heart beat as recorded by an electrocardiograph. FIG. 2 shows the characteristic wave form pattern with "V" indicating voltage and "1 HB" indicating one heart beat, and the relationship between the various waves which are identified by the letters P, Q, R, S, and T. These letters are the conventional lettering and nomenclature used by electrocardiologists.

A simplified circuit diagram for the arrangement shown in FIG. 1 is illustrated in FIG. 3. In utilizing the arrangement illustrated in FIGS. 1 and 3, the voltages at the coil terminals 22 and 23 may be substantially greater than those measured on a patient. For this reason, it may be advantageous to provide a voltage dropping circuit 32 as illustrated in FIG. 3 which may be enclosed in a suitable housing 32a as illustrated in FIG. 1. The circuit 32 may include three variable resistances 33, 34, and 35 arranged in a T network. The circuit 32 is also provided with a pair of output terminals, 36 and 37 adapted for connection to the input terminals of an electrocardiograph or a heart monitor.

FIG. 4 is an illustration of the shape of the disc 24 showing details of its outer periphery. It will be seen that the disc's outer periphery includes projecting masses of magnetic material arranged in a pattern related to the wave form pattern of the electrical activity associated with a human heart beat and that the disc's periphery is adapted to shift the lines of force linking the coil turns to generate voltages in the coil of the desired wave form on each rotation of the disc. In addition, it is obvious that the voltage waves may be increased in amplitude by increasing the radius of the portion of the disc corresponding to the wave peak. It can also be seen that the wave front is produced at the desired time rate, by properly shaping the slope of the appropriate portion of the disc. The particular shape of the periphery of the disc 24 to provide the desired signal wave form pattern is related to the mass of the disc, the geometry of the coil 20, the geometry of the magnetic field linking the turns of the coil 20, and the space relationship between the disc actuating medium 24 and the coil 20. The precise shape for the periphery of disc 24 to generate the desired wave form can be obtained in any convenient manner, for example, by grinding or filing a disc of magnetic material, using cut-and-try techniques on the material based on an electrocardiogram of the heart wave form. As the output voltage tends to be inversely proportional to the clearance between the coil and the disc actuating medium, the desired peak output voltage can then be obtained by moving the actuating medium at an appropriate rate and adjusting the clearance between the coil and the disc actuating medium.

Referring now to the mode of operation of the present invention, initially the motor 25 is placed in operation by means of the controls within the housing 27. The speed of the motor 25 is then adjusted by knob 31 to a convenient setting based on a typical heart rhythm, for example, about 85 revolutions per minute. The rotation of the motor 25 carries with it the shaft 26 and the disc 24 mounted on the shaft. The disc 24 is so mounted in relation to the coil 20 and its pole piece 21 that the lines of flux linking the turns of the coil 20 are periodically shifted as the peaks and valleys of the periphery of the disc of magnetic material 24 move past the pole piece 21. As the lines of flux linking the coil winding shift in position, they cut across the winding, generating a voltage in it. This voltage depends upon the rate of change of the magnetic field. The illustrated structure thus provides a magnetic coupling between the asymmetrical mass of material forming the disc actuating medium 24 and the coil 20. It will also be recognized that the coil 20 provides means for translating the electrocardiogram pattern of the disc periphery into an electrical signal which varies in the desired predetermined manner.

In utilizing the invention for testing cardiac devices such as an electrocardiograph or a heart monitor, the best results can be obtained by matching the output impedance of the circuit including the coil 20 to the input impedance of the cardiac diagnostic device. This can be accomplished by proper adjustment of the resistances 33, 34, and 35 in the voltage dropping circuit 32. The cardiac device provides best results when its input impedance matches the approximately 2,000 ohm impedance of a human body when an electrical potential is being generated. Accordingly, the circuit 32 may be adjusted so that the output impedance of the circuit measured at the terminals 36 and 37 approximately corresponds to the 2,000 ohm impedance of a human body.

In FIG. 5, a structure embodying the present invention is shown as it used to test a cardiac diagnostic device with the output terminals 36 and 37 connected to the input terminals of a heart monitor 40 which may be of the type comprising an electrical circuit enclosed in a relatively small case adapted for attachment to the forearm of a human patient. The case also functions as one of the monitor's electrodes. The other electrode is arranged for attachment to a spaced portion of the patient's body such as the other forearm. The monitor's circuit may include a speaker to provide audible signals indicative of the patient's heart action. In FIG. 5 the monitor 40 is undergoing test preparatory to use in monitoring the heart activity of a patient. The heart activity electrical wave form pattern provided at the terminals 36 and 37 is fed into the heart monitor 40 through a pair of leads 41 and 42. If the monitor is functioning properly, the characteristic heart monitor pattern of audible signals will then be heard from the speaker (not shown) of the monitor.

FIG. 6 shows the monitor 40 connected to the forearms of a patient whose heart is being monitored after the monitor has successfully completed the test operation illustrated in FIG. 5.

In FIG. 7, the structure of FIG. 3 is shown with the output terminals 36 and 37 connected to the input terminals of a conventional cathode ray oscilloscope 43. When the motor 25 is in operation at the desired speed and the controls of the oscilloscope 43 are properly adjusted and correlated to the speed of motor 25, a representation of the electrical signal pattern at the output terminals 36 and 37 will appear on the screen of the oscilloscope as shown. It will be noted that the generated wave form pattern 38 on the oscilloscope screen is substantially that depicted in the normal heart electrocardiogram shown in FIG. 2.

FIGS. 8 through 11 illustrate various arrangements of the coil, disc, and permanent magnet which may be employed to develop the desired signal pattern. In all of these arrangements, the magnetic material disc's periphery is shaped substantially like that of the disc 24 of FIGS. 1, 3, and 4. In FIG. 8, a disc 44 is mounted so that its axis of rotation is approximately in vertical registration with the longitudinal axis of the coil 45 with a plane (not shown) intermediate the sides of the disc 44 parallel with and approximately in alignment with the longitudinal axis of the coil. This arrangement is a simplified version of that shown in FIGS. 1 and 3.

With suitable relative spacing of disc and coil, satisfactory results can also be obtained when the flat sides of a disc 47 are mounted in transverse relation to the longitudinal axis of the coil 50 as shown in FIG. 9. It should be understood that suitable adjustments may be made in the distance between the axis of rotation of the disc 47 and the longitudinal axis of the coil 50 in order to develop the desired signal pattern, and the desired signal strength.

FIG. 10 illustrates another arrangement that can be employed in which a disc 51 is placed between a bar-type permanent magnet 52 which is axially aligned with a coil 53, with the sides of the disc 51 transverse to the longitudinal axis of the coil. Lines of flux associated with the magnet 52 will link the turns of the coil 53 and will be shifted on movement of the disc 51. Accordingly, in such arrangement the coil 53 does not require a pole piece of the permanent magnet type.

FIG. 11 illustrates still another arrangement that can successfully be employed in which a disc 54 is placed in alignment with and between a bar-type permanent magnet 55 and a coil 56, with the longitudinal axis of the bar-type permanent magnet 55, and the longitudinal axis of the coil 56 disposed in registration with a plane (not shown) parallel to and intermediate the sides of the disc 54. Here again the bar-type permanent magnet provides lines of flux linking the turns of coil 56, and a pole piece of the permanent magnet type is not required.

Another arrangement that can be employed is indicated in FIG. 12 in which a nonmagnetic disc 57, of a material such as aluminum metal is shown. The disc 57 is provided with an actuating medium consisting of masses of magnetic material which may conveniently be in the form of threaded fasteners 60 and 61, suitably secured to the disc 57 at proper locations to influence the flux lines associated with the permanent magnet coil pole piece (not shown) in order to generate the desired signal. Additionally, the nonmagnetic disc 57 includes a shaped mass of magnetic material 62 attached to its side 63 at the outer periphery of the disc. The mass 62 has a tapered form as shown in the side view of the disc 57 illustrated in FIG. 12a to generate the portion of the signal corresponding to the R wave of the heart wave form pattern. It should be noted that in FIG. 12 the radius of the disc 57 may be uniform about its axis of rotation and that the masses of magnetic material which influence the flux lines linking the coil turns extend axially in varying degrees in relation to the sides of the disc 57. On the other hand, in the modifications discussed previously such as that illustrated in FIGS. 1, 3, and 4, the disc may be flat and the radii of circumferentially spaced portions of the mass of magnetic material vary in relation to the wave form pattern of the electrical activity of a human heart. In regard to signal generating apparatus details not shown in FIG. 12 such as the coil, pole piece, motor, controls, and voltage dropping circuit, it should be understood that all of these details correspond to similar details shown in FIG. 3.

Turning now to FIG. 13, there is shown a version of the present invention which has been successfully employed in the regular production testing of heart monitors such as that described above. The FIG. 13 embodiment includes a motor 72 having a shaft 73 on which are mounted two cam-like discs 74 and 75 of magnetic material, one of these discs, the disc 74, having its outer periphery shaped to produce P, Q, R, and S waves. The other disc 75 includes structure whereby it can generate a T wave in addition to the P, Q, R, and S waves. A pair of conventional magnetic pickups 76 and 77 is mounted in proximity to the discs 74 and 75. The magnetic pickups 76 and 77 are connected into a circuit (not shown) enclosed within a suitable control housing 78 which includes a suitable voltage dropping network, control means including a control knob 79, and output terminals 80, 81, and 82. The output of pickup 76 is obtained at terminals 80 and 81, and the output of pickup 77 is obtained at terminals 80 and 82. In the production testing of heart monitors the operator conducting the test initially decides the wave form pattern to be fed to the monitor. If he wishes a wave form pattern having characteristics corresponding to the P, Q, R, S and T waves, he connects the monitor's terminals to terminals 80 and 82 associated with pickup 77. The motor is then placed in operation by means of the control knob 79. As pickup 77 is adjacent magnetic material disc 75, a voltage having a wave form including P, Q, R, S and T waves will be generated in the coil of pickup 77. If the monitor undergoing test is functioning properly, the characteristic heart monitor pattern of audible signals will then be heard from the speaker of the monitor (not shown). On the other hand, if the operator wishes to employ a test pattern omitting the T wave this can be accomplished by connecting the terminals of the monitor to terminals 80 and 81 associated with pickup 76. As magnetic material disc 74 adjacent pickup 76 is shaped to actuate the generation of a voltage pattern having only P, Q, R and S waves, the pattern of "beeps" emitted by the monitor under test will not include a "beep" corresponding to the T wave. It will thus be seen that the FIG. 13 embodiment provides an efficient apparatus and method for the regular production testing of heart monitors or similar apparatus.

The illustrated embodiments show signal generating apparatus in which magnetic material is moved relative to a stationary coil structure to obtain the desired signal pattern. However, it should be recognized that the desired signal pattern can also be obtained by substantially reversing the illustrated relationship between the coil and the magnetic material. Specifically, a coil in a magnetic field can be rotated about a stationary asymmetrically shaped mass of magnetic material having a configuration appropriately related to the wave pattern of the electrical activity of the heart, and the desired electrical wave form pattern can then be obtained at the coil's terminals by means of a conventional slip ring and collector brush arrangement.

The invention has been shown and described herein in terms of simulating the wave form pattern of the electrical activity of the human heart. However, it will be recognized that it can readily be applied to simulate other wave form patterns. Specifically, the invention can be applied to simulate the wave form pattern of the electrical activity of the heart of an animal such as a dog or a horse. It can be seen that only minor adjustments would be required to modify the structure shown in FIG. 1 of the drawings to generate a signal pattern corresponding to the electrical activity of the heart of an animal of particular interest, for example, a dog. This could readily be accomplished by adjusting the speed of rotation of the disc of magnetic material to an appropriate speed related to the dog's heart beat frequency, modifying the disc's periphery so as to develop an electrical signal pattern at the output terminals of the coil in accord with the wave form pattern measurable on the dog's body due to the electrical activity of its heart, and adjusting the magnitude of the voltage by suitable adjustments to the impedance of the circuit.

The illustrated and described embodiments of the invention provide reliable, positive, and accurate apparatus for testing cardiac monitoring, measuring, or registering devices so that proper operating condition for accurately reflecting the electrical activity of a human heart may be determined. It will also be recognized that there is disclosed above a completely reliable method for testing cardiac diagnostic tools such as electrocardiographs and heart monitors.

While there has been described what is at present considered to be the preferred embodiments of the invention, it will be understood that various other modifications will be suggested to those skilled in the art and these too are intended to be included within the scope of the appended claims.

I claim:

1. Apparatus for generating an electrical signal pattern having the wave form and magnitude characteristics of the potentials associated with a living body due to the electrical activity of the heart, comprising: an electrical coil having a plurality of turns and a pair of terminals; a permanent magnet mounted so that the flux lines of its magnetic field link the turns of said coil; means for periodically shifting the lines of flux linking the turns of said coil in a predetermined manner including a disc of magnetic material having a shaped peripheral edge providing a series of projecting masses of magnetic material arranged in a configuration proportionally related to a graphical representation of the electrical potential cycle associated with the heart of a living body; means for mounting said shifting means and said permanent magnet in operative relationship; and means for establishing relative movement between said current conducting means and said disc, said movement establishing means comprising a motor having a shaft to rotate said disc, to cause the lines of flux linking said coil turns to cyclically shift in proportion to the changing mass of magnetic material passing near said coil due to the rotation of said disc so that the voltages measured at the terminals of the coil have a wave form pattern substantially corresponding to that of the potentials measurable on a living body due to the electrical activity of the heart.

2. Apparatus as claimed in claim 1, in which said disc is flat and the projecting masses consist of a series of radial projections having shapes related to the P, R, and T waves of a conventional electrocardiogram.

3. Apparatus as claimed in claim 1, in which there is means to adjust the magnitude of the signal generated by said apparatus to correspond to the magnitude of the potentials measurable on a living body, said signal adjusting means consisting of an impedance network having an output impedance within a predetermined desired range connected into a circuit which includes the terminals of said coil.

4. A heart simulator for simulating the electrical characteristics of the heart, comprising: a coil having a plurality of turns, a permanent magnet pole piece for said coil, a cam-like disc of magnetic material mounted adjacent said pole piece, the periphery of said disc having a configuration proportionally related to a graphical representation of one cycle of the potentials measurable on a body due to the electrical activity of the heart, and means for rotating said disc relative to said coil thereby to cyclically vary the lines of flux linking the turns of said coil, said rotating means including a shaft carrying said disc, and a motor to drive said shaft.

5. Apparatus for generating an electrical signal pattern having the characteristics of the potentials measurable on a living body due to the electrical activity of the heart comprising: a mass of magnetic material shaped to be proportionally related to a graphical representative of the electrical potential cycle generated by a living heart, greater portions of said mass of material being arranged to coincide with the voltage peaks of said electrical potential cycle, means for translating said shaped mass of material into a varying flow of electrical current corresponding to the shape of said mass, means for cyclically coupling said mass of shaped material with said translation means, and means for converting said cyclically varying flow of electrical current into indicia representative of a graphical representation of the electrical potential cycle generated by a living heart.

References Cited in the file of this patent

UNITED STATES PATENTS

| | | |
|---|---|---|
| 2,438,605 | Hart | Mar. 30, 1948 |
| 2,834,898 | Partridge | May 13, 1958 |
| 2,872,151 | Martin | Feb. 3, 1959 |